(12) United States Patent
Bilicksa et al.

(10) Patent No.: US 7,457,948 B1
(45) Date of Patent: Nov. 25, 2008

(54) AUTOMATED AUTHENTICATION HANDLING SYSTEM

(75) Inventors: Carl Bilicksa, Readington, NJ (US); Douglas Allen Sisk, High Bridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1567 days.

(21) Appl. No.: 09/675,399

(22) Filed: Sep. 29, 2000

(51) Int. Cl.
*G06F 15/16* (2006.01)
*G06F 17/00* (2006.01)

(52) U.S. Cl. .................... 713/155; 713/170; 707/9

(58) Field of Classification Search .................. 707/1, 707/3, 5, 10, 104.1, 203, 204, 9; 709/201, 709/200, 212, 218, 224, 225, 229; 713/156, 713/173, 186, 201, 200, 51, 167; 370/352; 726/4, 10
See application file for complete search history.

(56) References Cited

U.S. PATENT DOCUMENTS

| | | | | | |
|---|---|---|---|---|---|
| 5,862,325 | A | * | 1/1999 | Reed et al. | 709/201 |
| 6,233,577 | B1 | * | 5/2001 | Ramasubramani et al. | 707/9 |
| 2001/0027519 | A1 | * | 10/2001 | Gudbjartsson et al. | 713/168 |
| 2001/0042107 | A1 | * | 11/2001 | Palm | 709/218 |
| 2001/0044843 | A1 | * | 11/2001 | Bates et al. | 709/224 |
| 2001/0044898 | A1 | * | 11/2001 | Benussi et al. | 713/173 |
| 2002/0054587 | A1 | * | 5/2002 | Baker et al. | 370/352 |

* cited by examiner

*Primary Examiner*—Tony Mahmoudi

(57) ABSTRACT

An automated authentication handling system for use by clients on a network including a plurality of application servers connected to the network, each requiring authentication for access and an authentication server adapted to authenticate at least one of the clients and establish a trusted communication link for access by an authenticated user to at least one of the application servers.

18 Claims, 4 Drawing Sheets

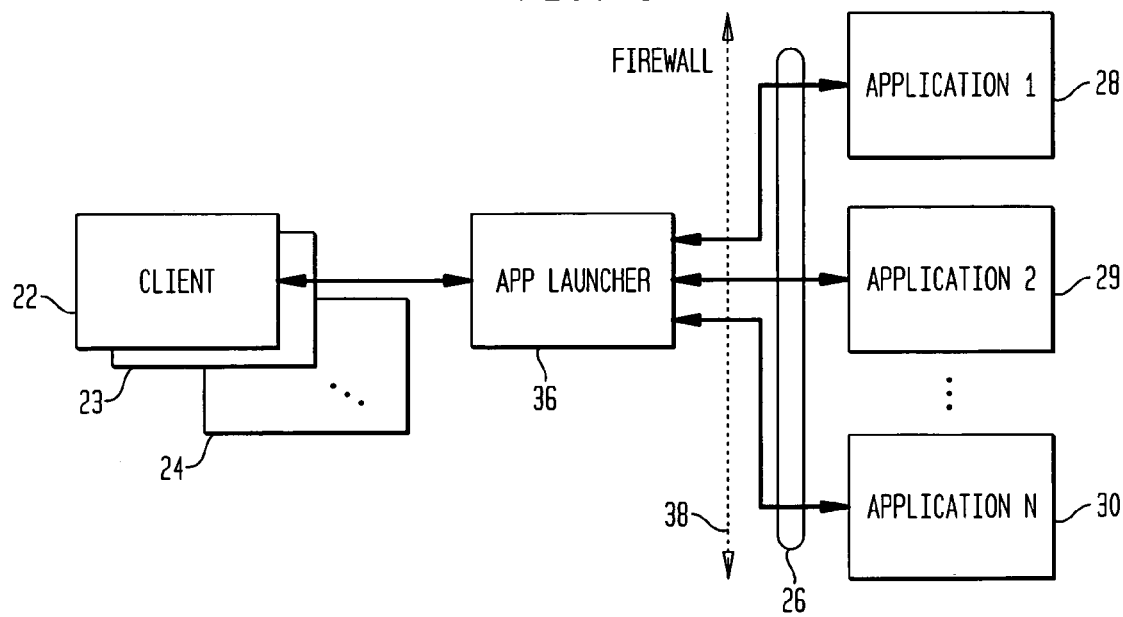
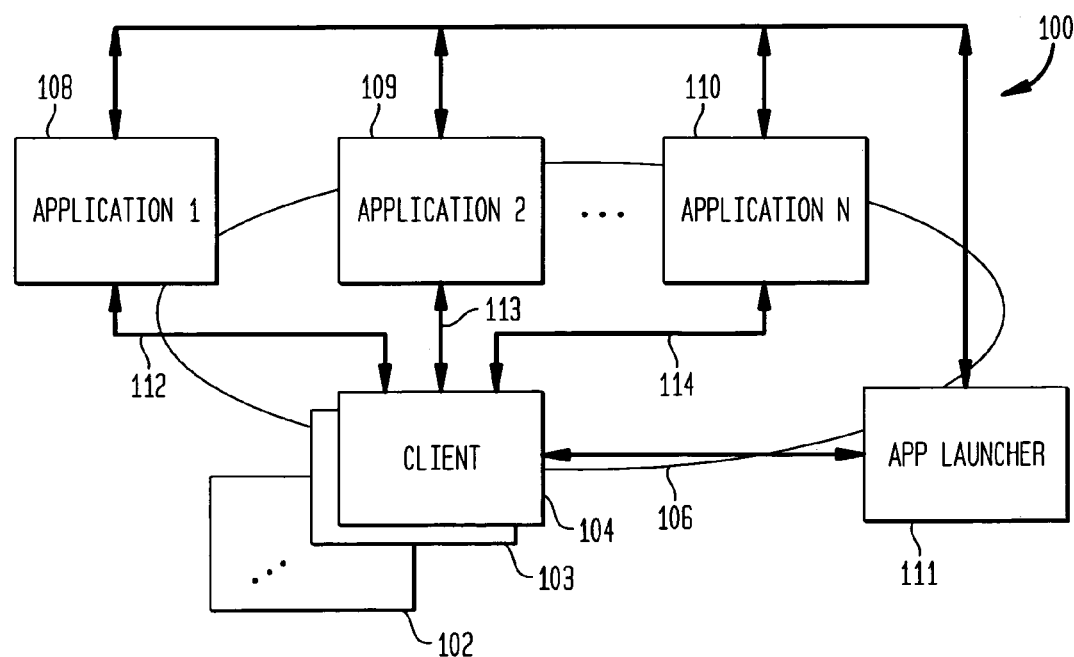

AUTOMATED AUTHENTICATION HANDLING SYSTEM

BACKGROUND OF THE INVENTION

1. Field of the Invention

The invention relates to an automated authentication handling system. More particularly, the present invention relates to automating the authentication of a client among multiple servers.

2. Description of the Related Art

With the advent of networked computing systems, the user's need to use information and services distributed across computer networks and, in particular, the Internet has grown. In many instances, access to remote services and applications is restricted and requires an authentication process by the user before access is provided. As many more services are provided on such networks, the task of providing a separate authentication for each service can become burdensome to the end user. This can be especially true when the services are related in tasks or ownership.

FIG. 1 illustrates a conventional configuration wherein clients 22-24 are connected to a network 26. A plurality of application servers 28-30 each having an authentication engine 32 are also connected to the network 26. Communication to these application servers by the clients, shown for purposes of illustration by lines 34-36 requires that the clients first establish a communications link with the application server 28-30 and then interact with the respective authentication engines 32 to establish access to the application server. In some instances establishing a trusted communication link meant that clients co-located at a facility were dedicated to communicate with a selected application server. Users wishing to use different applications had to physically move from client to client when wishing to access different application servers.

FIG. 2 illustrates another configuration wherein the clients 22-24 again connects to application servers 28-30 though a network 26; however, the authentication engines 32 of FIG. 1 are co-located on a single authentication server 34. While suitable for its intended purpose, the client must still log into each of the application servers separately. Authentication occurs between the application servers and the authentication server for the client's establishment of a communications link.

FIG. 3 illustrates another configuration wherein the clients 22-24 and application servers 28-30 are connected via the network 26 through an authentication server 36. In this instance the authentication server functions as a router in which the client 32 communicates to with each of the application servers through the authentication server 36 and can include a firewall 38 for security. While an improvement over existing authentication topologies, this authentication server can limit the client's access to the application by managing all communication between the client and the desired application server. In instances where a number of clients require communication the authentication server can delay communication between the application server and the client.

Thus, the need exists for a system for minimizing the authentication process across multiple servers in which authentication information can be distributed to multiple servers across a network.

SUMMARY OF THE INVENTION

The present invention is an automated authentication handling system that allows for a user to initiate a single authentication process with an authentication server that automatically handles the authentication of the user for all other servers across the network where the user is permitted access. The authentication server further establishes a trusted communication link between the user and at least one of the other servers.

The present invention can be more fully understood by reference to the following description and accompanying drawings, which form an integral part of this application:

BRIEF DESCRIPTION OF THE DRAWINGS

FIGS. 1-3 are functional block diagrams of typical client network connection topologies;

FIG. 4 is a functional block diagram of a client network connection to application servers using an authentication server of the present invention;

DETAILED DESCRIPTION OF THE PREFERRED EMBODIMENTS

Figure 1:
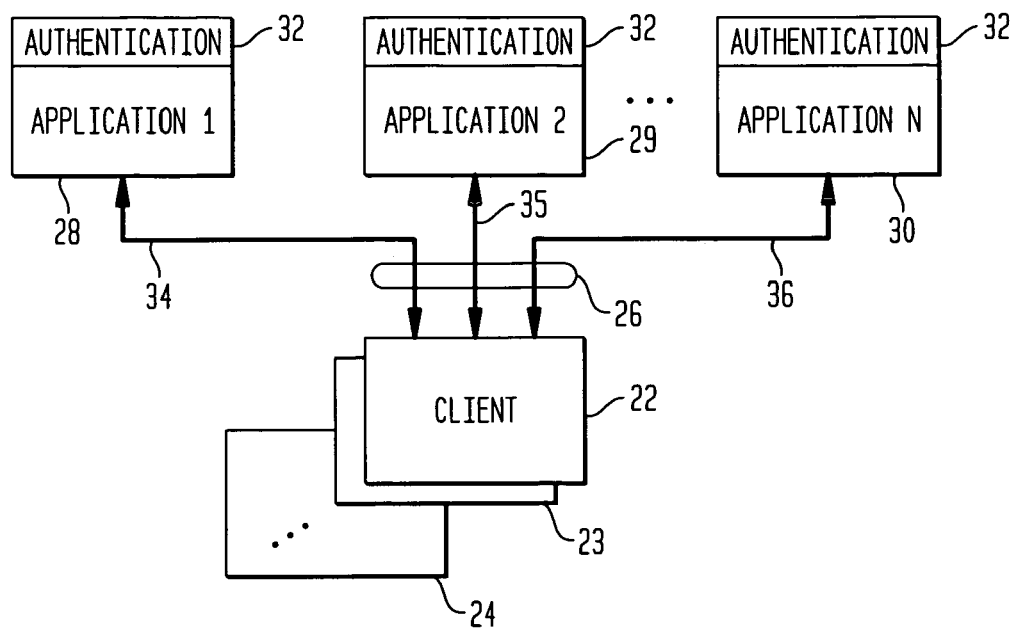
Figure 2:
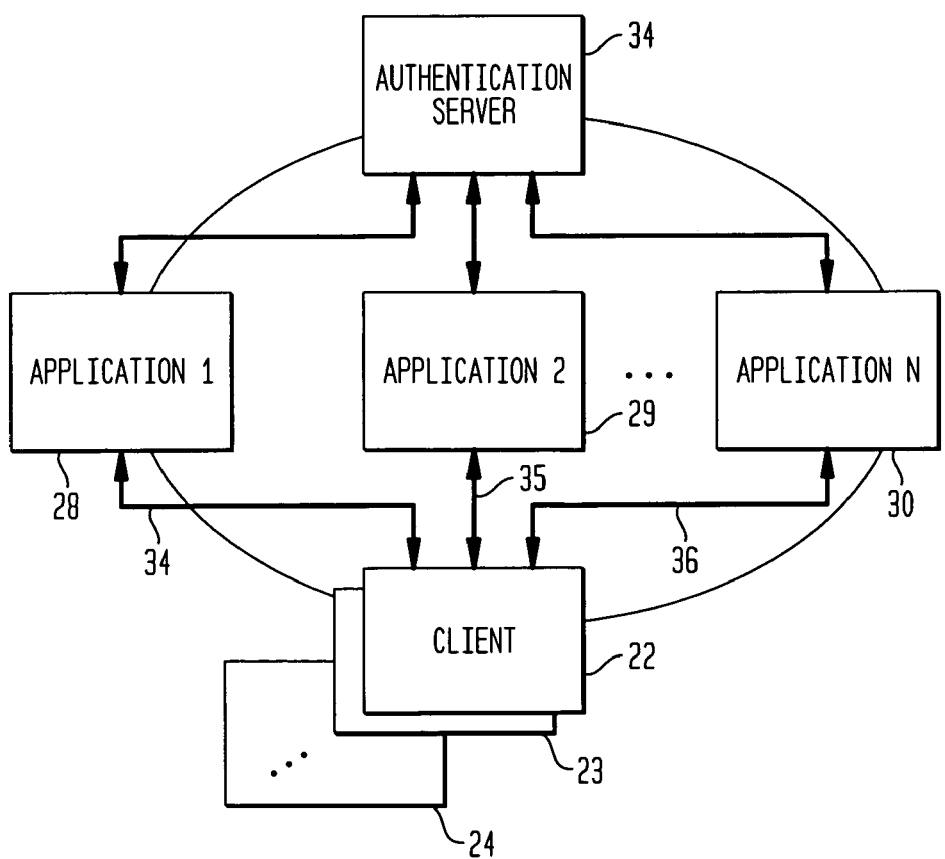

With reference to FIG. 4 for purposes of illustration, an automated authentication handling system 100 according to the present invention includes a plurality of clients 102-104 that are connected via a network 106 such as the Internet or an intranet. Similarly a plurality of application servers 108-110 are connected to the network. Advantageously the present invention includes an authentication server 111 connected to the network 106 and configured to authenticate the clients and application servers to establish a communication link 112-114 directly between the clients 102-104 and the application servers 108-110. For purposes of illustrating the features of this invention, the invention will be described in the context of the Internet protocols and more particularly the HyperText Transfer Protocols. However those skilled in the art will appreciate that the features of this invention may be utilized on any network protocol platform.

The authentication server 111 generally may include conventionally available hardware and software for connecting to the network and interacting with the network communication protocols used by the network. For example, when used over the Internet the server may include web server software of the type published by Apache Digital Corporation of Durango, Colo. The Apache web server software is preferred as the server software may be easily configured to include specialized tasks using software compatible with the Common Gateway Interface (CGI). The authentication server of the present invention includes two specialized tasks or modules (FIG. 5), namely, an identifier engine 116 and a communication initiation engine 118.

Figure 5:
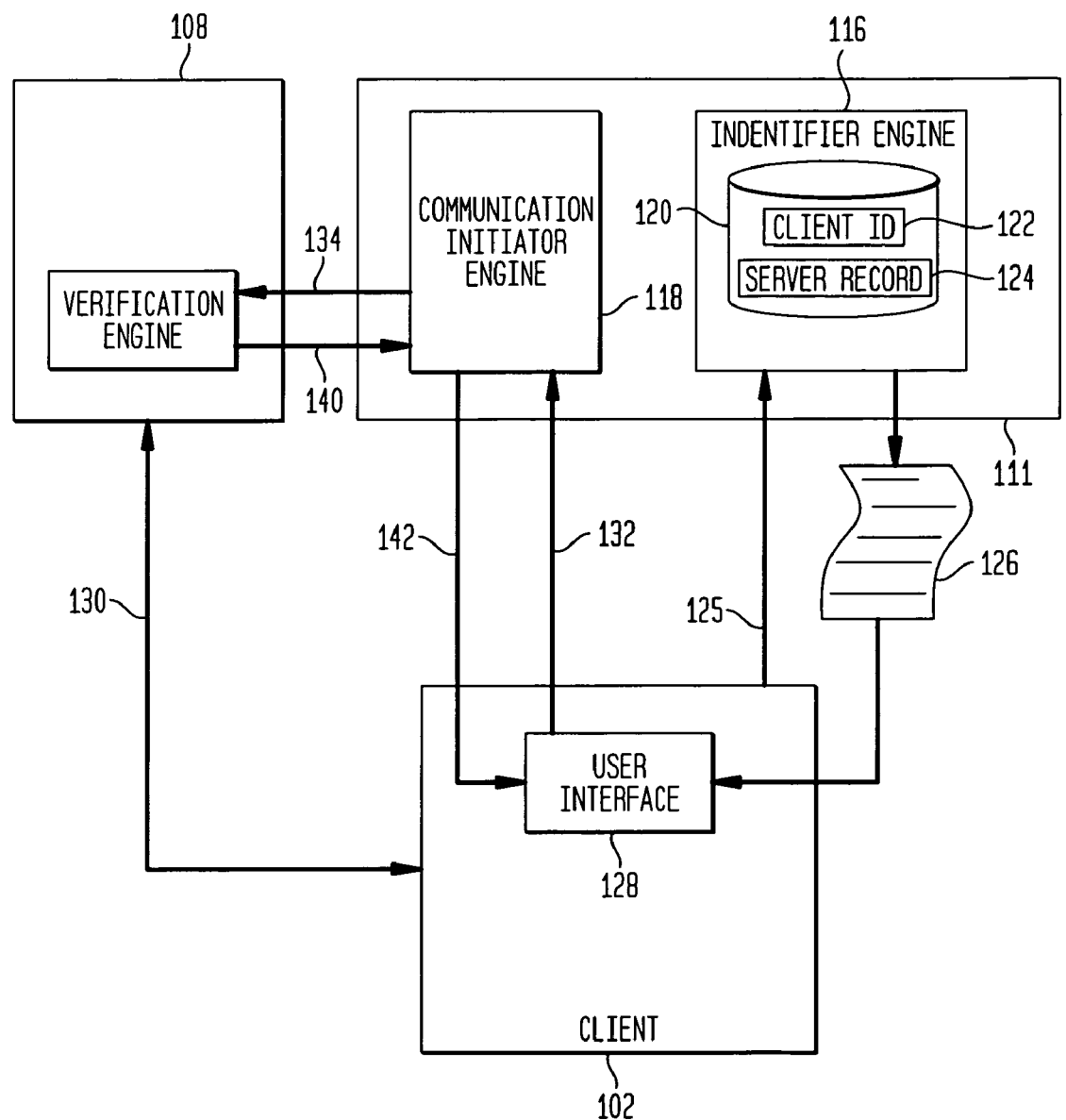
FIG. 5 is a functional block diagram of an authentication server having an identifier engine and a communication initiator engine.

With continued reference to FIG. 5, the identifier engine 116 includes a database 120 having a plurality of client identifier records 122 and a plurality of application server records 124. Each of the client identifier records is related to one or more of the application servers. The relationships of the client identifier records to the application servers is preferably tailored to the desired relationships between the clients 102-104 and the applications servers 108-110. The result of the relationships is that for each client identifier in the database a listing of application servers authorized by the client identifier may be generated in a report. When a client provides a client identifier, a report 126 is generated and sent to the client containing a listing of the application servers authenticated for access by the client identifier. The report is preferably generated in a hyper-text format such as the hyper-text markup language (HTML) used by the hyper-text transfer protocol (HTTP) which makes up a part of the Internet protocols. The hyper-text format is embedded with a link for each application server in the listing. The link addresses the communication initiator engine on the authentication server and includes a request to establish a communication link with associated application server. This request is preferably in the form of an HTML POST command in which the application server is provided in the hypertext document in an encrypted format. This prevents the temptation by the user at the client to modify the hypertext document to change the access privileges.

Accordingly, the hypertext report provides a user interface 128 that may be used by a client when the hypertext document is loaded by a conventional web browser of the type such as Explorer published by Microsoft or Navigator published by Netscape. The user interface 128 when used on a client having a conventional graphical user interface such as Microsoft Windows or Apple Macintosh OS. may appear as a separate window that can be accessed when needed by a user on the client. Using the HTML language it will be appreciated that a number of user interface configurations may be used including, but not limited to, pull-down menus or hypertext listings. Once the document has been sent to the client, no further authentication by the user is required to access the application servers contained in the listing. This user interface provides a great advance over existing, authentication methodologies as the user does not have to provide a separate authentication for each of the application servers. Furthermore, it will be appreciated that the authentication administration can be handled by a single server rather than having separate authentication administration for each of the application servers. The client's communication with the authentication server 111 may include a Secure Socket Layer (SSL) session link, cookies or other conventional security measures that may be used to verify continued communication from the client to the authentication server.

In another embodiment, the client identifier is further related to session assignment information for each of the application servers. The session assignment can include information for limiting client access to the features on each of the application servers as well as session timeout information. It will be appreciated that the session assignment information may be specifically tailored to the access capabilities of each of the application servers. When the report in hypertext format is sent to the client the link designating a request for an application server my be encoded with the application server information also in an encrypted format.

The communication initiator engine 118 is responsive to a request from the client to establish a communication link 130 with one of the application servers. The communication initiator engine 118 preferably receives the encrypted request information illustrated by line 132 and decrypts the information. The request information is preferably compared to a look-up table in which each application server and session assignment information is stored as a separate listing. The authentication server matches the client's request with the appropriate listing. The listing is combined with the client's address. The client address and the session information is then encrypted by the communication initiator engine and transmitted to the application server illustrated by line 134 again using the HTTP POST method.

The application server receives the information transmitted in the post command and includes a verification engine 136, preferably running as a CGI script on the application server. It should be noted that the verification engine 136 does not verify that the information was received by checking the IP address of a trusted authentication server, rather it decrypts the posted information and uses a shared secret data field to verify the authentication server. It will be appreciated by those skilled in the art that such verification allows for the dynamic IP addressing of the authentication server. The encryption/decryption method used by the present invention may vary; however, a public key/private key methodology is presently preferred. Thus, the decryption of information from the authentication server is decrypted using the private key contained on the application server. The decrypted information includes the session assignment information and the client's address. The pushed information also preferably includes a verification record that contains secret information shared exclusively between the authentication server and the application as a further verification that the information was transmitted from a trusted source. If the verification fails an error message is returned and no further action is taken.

If the verification is cleared, a Uniform Resource Locator (URL) is generated containing a unique address for the client to access the application and further includes session assignment information that is encrypted by the verification engine prior to transmittal. The special URL is then transmitted to the Authentication Server illustrated by line 140 which in turn forwards the URL directly to the Client illustrated by line 142. Once received by the client, the URL is addressed back to the application server directly from the client along with the encrypted session information initiating the communication link 130. The application server again decrypts the session information and verifies that the URL request was transmitted from the IP address of the client 102 originally transmitted to the application server by the authentication server. The application server also verifies that the session timeout time is still valid. The application server then establishes the trusted communication link 134 directly with the client. The trusted communication link 134 may include security such as an SSL communications link or a cookie containing the relevant session information may be placed on the client's computer. The cookie is used by the application to verify the user and provide other information relevant to the session such as a session time-out information. The URL then redirects the Client to the application page of the web site.

Figure 6:
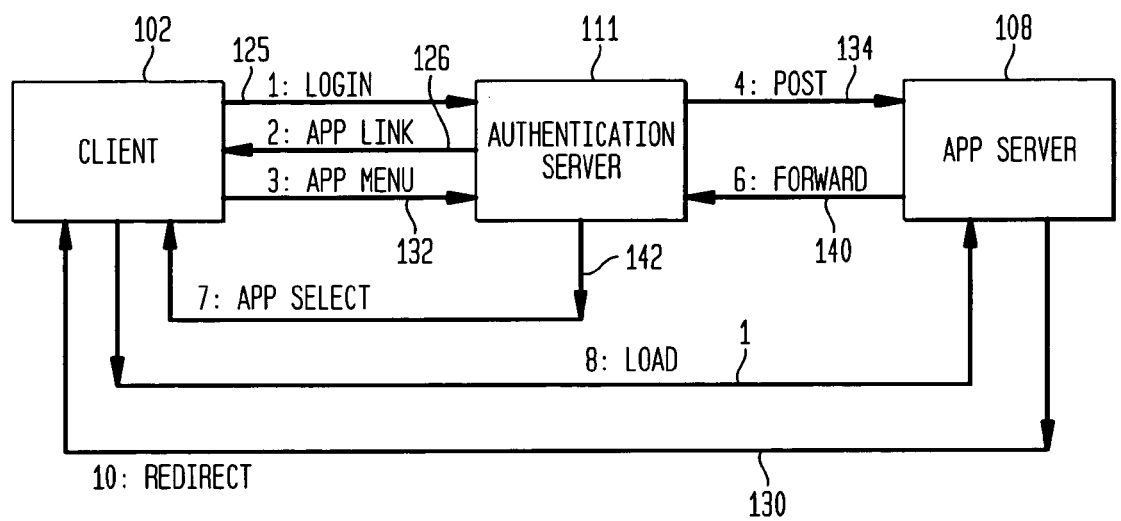
FIG. 6 is a functional block diagram of a authentication signal flow during an authentication.

With reference to FIG. 6, the signaling between a client 102 and an application server 108 using an authentication server 108 includes initiating a login request from the client to the authentication server illustrated by line 125. The authentication server replies with a report in hypertext listing the application servers authorized access by the client illustrated by line 126. A client selects an application server for access and submits a request to the authentication server illustrated by line 132. The authentication server forwards the request to the application sereer illustrated by line 134. The application server responds and confirms access as illustrated by line 140. The authentication server forwards the selection authorization to the client 102 illustrated by line 142. The client 102 and application server 108 establish and communicate via a trusted communication link illustrated by line 130.

It is understood that the above description and drawings are illustrative of the present invention and details contained therein are not to be construed as limitations on the present invention. Changes in procedure and structure may be made without departing from the scope of the present invention as defined in the following claims.

What is claimed is:

1. A method for authenticating a client to one or more application servers comprising the steps of:
   receiving a login request that includes a client identifier;
   providing a report containing a list of one or more pre-authenticated application servers associated with the client identifier that the client can access;
   receiving a pre-authentication request to establish a communication link between the client and a selected application server in the list;
   providing the selected application server with information, including the client identifier, for authenticating a link request sent directly from the client to establish the link between the client and application server; and
   providing the client with information, including the client identifier, to forward the link request directly to the selected application server to establish the link to establish the link between the client and application server.

2. The method of claim 1, wherein the information provided to the selected application server comprises an address for the client and session assignment information regarding the link request.

3. The method of claim 1, wherein the information provided to the selected application server comprises encrypted information.

4. The method of claim 2, wherein the session assignment information comprises at least one of the following:
   information for limiting access by the client to features on the selected application server; and
   session timeout information.

5. The method of claim 1, wherein the information provided to the client comprises a unique address for the client to access the selected application server, and session assignment information regarding the link request.

6. The method of claim 5, wherein at least one of the unique address and the session assignment information are encrypted.

7. The method of claim 1, wherein the report comprises a hypertext link to each of the one or more application servers, respectively.

8. The method of claim 7, wherein the hypertext link comprises a command prepared for a communication initiator engine to use in communicating with the one application server.

9. The method of claim 1, wherein the report is encrypted.

10. An authentication server for authenticating a client to one or more application servers comprising:
    an identifier engine for receiving a login request that includes a client identifier and providing a report containing a list of one or more pre-authenticated application servers associated with the client identifier that the client can access; and
    a communication initiator engine for,
       receiving a pre-authentication request to establish a communication link between the client and a selected application server in the list;
       providing the selected application server with information, including the client identifier, for authenticating a link request sent directly from the client to establish the link between the client and application server; and
       providing the client with information, including the client identifier, to forward the link request directly to the selected application server to establish the link between the client and application server.

11. The server of claim 10, wherein the information provided to the selected application server comprises an address for the client and session assignment information regarding the link request.

12. The server of claim 10, wherein the information provided to the selected application server comprises encrypted information.

13. The server of claim 11, wherein the session assignment information comprises at least one of the following:
    information for limiting access by the client to features on the selected application server; and
    session timeout information.

14. The server of claim 11, wherein the information provided to the client comprises a unique address for the client to access the selected application server, and session assignment information regarding the link request.

15. The server of claim 14, wherein at least one of the unique address and the session assignment information are encrypted.

16. The server of claim 10, wherein the report comprises a hypertext link to each of the one or more application servers, respectively.

17. The server of claim 16, wherein the hypertext link comprises a command prepared for a communication initiator engine to use in communicating with the one application server.

18. The server of claim 10, wherein the report is encrypted.

* * * * *